(12) United States Patent
Yang et al.

(10) Patent No.: US 7,960,056 B2
(45) Date of Patent: *Jun. 14, 2011

(54) BINDER FOR ELECTRODE MATERIAL CONTAINING SEMI-IPN OF POLYVINYL ALCOHOL AND POLYURETHANE AND LITHIUM SECONDARY BATTERY EMPLOYED WITH THE SAME

(75) Inventors: SeungRim Yang, Daejeon (KR); Young-Min Kim, Daejeon (KR); Juhyun Kim, Daejeon (KR); Ki Woo Chun, Daejeon (KR); Minjung Ryu, Seoul (KR); Eun-Suok Oh, Daejeon (KR); Min Ho Cho, Seoul (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/310,341

(22) PCT Filed: Aug. 10, 2007

(86) PCT No.: PCT/KR2007/003834

§ 371 (c)(1),
(2), (4) Date: Sep. 24, 2009

(87) PCT Pub. No.: WO2008/023895

PCT Pub. Date: Feb. 28, 2008

(65) Prior Publication Data

US 2010/0047693 A1  Feb. 25, 2010

(30) Foreign Application Priority Data

Aug. 21, 2006  (KR) .................. 10-2006-0078502

(51) Int. Cl.
*H01M 4/02* (2006.01)
*H01M 4/58* (2006.01)

(52) U.S. Cl. .... 429/217; 429/209; 429/219; 429/231.95

(58) Field of Classification Search ................ None
See application file for complete search history.

(56) References Cited

U.S. PATENT DOCUMENTS

| 5,523,149 A * | 6/1996 | Kijimuta et al. ........... 428/32.34 |
| 5,525,444 A | 6/1996 | Ito et al. |
| 6,194,098 B1 | 2/2001 | Ying et al. |
| 6,387,148 B1 | 5/2002 | Nakano et al. |
| 6,939,644 B2 | 9/2005 | Aoshima et al. |
| 6,946,218 B2 | 9/2005 | Crouch, Jr. et al. |
| 2002/0009576 A1 * | 1/2002 | Fu et al. ........................ 428/195 |
| 2002/0122985 A1 * | 9/2002 | Sato et al. ..................... 429/232 |
| 2003/0073000 A1 | 4/2003 | Lee et al. |
| 2004/0130038 A1 | 7/2004 | Murakami et al. |
| 2004/0252169 A1 * | 12/2004 | Chen et al. ....................... 347/96 |
| 2007/0264570 A1 * | 11/2007 | Oh et al. ....................... 429/217 |

FOREIGN PATENT DOCUMENTS

| JP | 56082573 A * | 7/1981 |
| JP | 10219098 A | 8/1998 |
| JP | 11-001676 A | 1/1999 |
| JP | 11067216 A | 3/1999 |
| JP | 2003-109596 A | 4/2003 |
| JP | 2004-134208 A | 4/2004 |
| JP | 2004-342318 A | 12/2004 |
| KR | 2001-0010226 A | 2/2001 |
| KR | 20010025102 | 3/2001 |
| KR | 2002-0062193 A | 7/2002 |
| KR | 2003-0032364 A | 4/2003 |
| KR | 2006-0001719 A | 1/2006 |
| KR | 20070072237 A | 7/2007 |
| WO | 00/07253 A1 | 2/2000 |
| WO | 2005011030 A1 | 2/2005 |
| WO | WO 2007083874 A1 * | 7/2007 |

OTHER PUBLICATIONS

International Search Report issued on Nov. 19, 2007 in connection with corresponding International Appln. No. PCT/KR2007/003834.
The definition of polyurethane, Hawley'sCondensed Chemical Dictionary, 14th edition, 2002, John Wiley & Sons, Inc.
International Search Report, PCT/KR2006/004441, dated Jan. 30, 2007.

* cited by examiner

*Primary Examiner* — Robert Hodge
(74) *Attorney, Agent, or Firm* — Lerner, David, Littenberg, Krumholz & Mentlik, LLP

(57) ABSTRACT

Provided is a binder for an electrode mix containing a semi-interpenetrating polymer network (semi-IPN) of polyvinyl alcohol and polyurethane, wherein the polyurethane is mixed to crosslink with the polyvinyl alcohol to form semi-IPN, and a lithium secondary battery comprising the same. The binder has superior adhesion to the electrode, excellent electrolyte resistance and improved elongation percentage, and therefore it is possible to prevent exfoliation or separation of electrode active materials from current collectors which occurs during repeated charge/discharge cycles. As a result, the capacity or power out of secondary batteries can be maintained at a constant level.

14 Claims, No Drawings

BINDER FOR ELECTRODE MATERIAL CONTAINING SEMI-IPN OF POLYVINYL ALCOHOL AND POLYURETHANE AND LITHIUM SECONDARY BATTERY EMPLOYED WITH THE SAME

CROSS REFERENCE TO RELATED APPLICATIONS

The present application is a national phase entry under 35 U.S.C. §371 of International Application No. PCT/KR2007/003834, filed Aug. 10, 2007, published in English, which claims priority from Korean Patent Application No. 10-2006-0078502, filed Aug. 21, 2006. The disclosures of said applications are incorporated by reference herein.

FIELD OF THE INVENTION

The present invention relates to a binder for an electrode mix containing a semi-interpenetrating polymer network (semi-IPN) of polyvinyl alcohol and polyurethane, and a lithium secondary battery comprising the same. More specifically, the present invention relates to a binder for an electrode mix having an excellent elongation percentage and an improved electrolyte resistance by crosslinking network formation of polyurethane into a polyvinyl alcohol having superior adhesive strength between an active material and a current collector and between the active materials, which enables fabrication of a battery having an excellent charge/discharge efficiency and a long service life by suppressing volumetric changes of electrodes occurring during charge/discharge cycles of the battery and preventing the occurrence of electrode cracking, and a lithium secondary battery comprising the same.

BACKGROUND OF THE INVENTION

Technological development and increased demand for mobile equipment have led to a rapid increase in the demand for secondary batteries as an energy source. Among these secondary batteries, lithium secondary batteries having high energy density and voltage are commercially available and widely used. The lithium secondary batteries generally use a lithium transition metal oxide as a cathode active material and a graphite-based material as an anode active material.

However, the anode formed of the graphite-based material has a maximum theoretical capacity of only 372 mAh/g (844 mAh/cc), thus suffering from a limited increase of capacity thereof. Consequently, such a graphite-based anode is incapable of carrying out a sufficient role as an energy source for next-generation mobile equipment undergoing rapid development and advancement. Further, lithium metals, studied for use as the anode material, have a very high energy density and thus may realize a high capacity, but raise problems associated with safety concerns due to growth of dendrites and a shortened cycle life as charge/discharge cycles are repeated. In addition, use of carbon nanotubes (CNTs) has been attempted as an anode active material, but various problems have been pointed out such as low productivity, expensiveness and low initial efficiency of less than 50%.

In this connection, a number of studies and suggestions have been recently proposed as to silicon, tin or alloys thereof, as they are known to be capable of performing reversible absorption (intercalation) and desorption (deintercalation) of large amounts of lithium ions through the chemical reaction with lithium. For example, silicon (Si) has a maximum theoretical capacity of about 4020 mAh/g (9800 mAh/cc, a specific gravity of 2.23) which is substantially greater than the graphite-based materials, and thereby is promising as a high-capacity anode material.

However, upon performing charge/discharge processes, silicon, tin or alloys thereof react with lithium, thus undergoing significant changes of volume, i.e., ranging from 200 to 300%, and therefore repeated charge/discharge may result in separation of the anode active material from the current collector, or significant physicochemical changes at contact interfaces between the anode active materials, which are accompanied by increased resistance. Therefore, as charge/discharge cycles are repeated, the battery capacity sharply drops, thus suffering from a shortened cycle life thereof. For these problems, when a conventional binder for a graphite-based anode active material, i.e., polyvinylidene fluoride or styrene butadiene rubber, without any special treatment or processing, is directly applied to a silicon-or tin-based anode active material, it is impossible to achieve desired effects. In addition, when an excessive amount of a polymer as a binder is used to decrease volumetric changes occurring during charge/discharge cycles, separation of the active material from the current collector may be decreased to some degree, but the electrical resistance of the anode is increased by an electrical insulating polymer used as the binder and the amount of the active material is relatively decreased, which consequently results in problems associated with a reduced battery capacity.

In order to cope with such problems, there is an urgent need for the development of an excellent binder which is capable of maintaining the adhesion with the current collector while absorbing large volumetric changes of anode active materials occurring during the charge/discharge process in lithium secondary batteries using the silicon-or tin-based anode active material.

On the other hand, use of polyvinyl alcohol or thermosetting plasticized polyvinyl alcohol having superior adhesive strength has been attempted as a binder for an electrode of a lithium secondary battery (see Japanese Unexamined Patent Publication Nos. 1999-67216, 2003-109596 and 2004-134208). However, the above-mentioned polyvinyl alcohol binder exhibits superior adhesive strength, as compared to conventional binders, but suffers from a very low viscosity, non-uniform application of the binder on copper foil as a current collector and process problems associated with thermal treatment necessary to improve adhesion between the electrode mix and the current collector.

For example, International Publication No. WO 2000-007253 discloses a binder which is comprised of a combination of polymers selected from a variety of polymers including polyvinyl alcohol and polyurethane. Korean Patent Application Publication No. 2006-001719 A1 discloses a method of preparing an anode active material for a lithium secondary battery, using a resin composite which is prepared by coating graphite and at least one metal selected from the group consisting of Si, Sn and Al with a fixing agent such as a polyvinyl alcohol resin, a urethane resin, or the like. In connection with the preparation of the cathode for a lithium-sulfur secondary battery, Korean Patent Application Publication No. 2003-0032364 A1 discloses a technique which involves preparation of an active material including a conductive material by binding between the sulfur active material and the conductive material using a combination of polymers selected from a variety of polymers including polyvinyl alcohol and polyurethane as a first binder, and employs a second binder component insoluble in the solvent of the first binder, as a binder between the active materials including the conductive material and between the active material and the current collector.

However, the aforementioned conventional arts merely exemplify various kinds of polymers that may be used as binders or fixing agents, and do not suggest a mixture binder made of a certain combination in accordance with the present invention, as will be illustrated hereinafter. Further, none of the aforementioned prior arts teach or imply that the selection of such a certain combination will bring about significant synergistic effects in adhesive strength and elongation percentage of the binder.

Meanwhile, Korean Patent Application Publication No. 2002-062193 A1 discloses a semi-interpenetrating polymer network (semi-IPN) formed by the combination of a polyvinyl alcohol derivative and a compound having crosslinkable functional group(s), as a binder, wherein the polyvinyl alcohol derivative is a polymer compound having an oxyalkylene chain-containing polyvinyl alcohol unit in which hydroxyl groups are partially or completely substituted by oxyalkylene-containing groups, and compounds having two or more reactive double bonds are exemplified as the compound having crosslinkable functional group(s). However, this art suffers from a serious problem in that partial or complete substitution of hydroxyl groups of polyvinyl alcohol leads to significant deterioration in physical properties of the polyvinyl alcohol, thus failing to express a desired level of adhesive strength.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that the use of a polyvinyl alcohol-polyurethane semi-IPN as a binder provides superior adhesive strength to active materials and current collectors, and excellent electrolyte resistance of a polymer in conjunction with a moderate elongation percentage, and it is thus possible to improve battery properties and performance such as initial capacity, cycle characteristics, etc. The present invention has been completed based on these findings.

DETAILED DESCRIPTION OF PREFERRED EMBODIMENTS

In accordance with an aspect of the present invention, the above and other objects can be accomplished by the provision of a binder for an electrode mix comprising a semi-interpenetrating polymer network (semi-IPN) of polyvinyl alcohol and polyurethane, wherein the polyurethane is mixed to crosslink with the polyvinyl alcohol to form the semi-IPN.

Even though basic properties of the polyvinyl alcohol and polyurethane are known in the art, it was confirmed that physical properties of the binder having the semi-IPN structure of the polyvinyl alcohol and polyurethane, as will be seen in the following Experimental Examples, exhibit significant improvements far beyond general expectations.

Accordingly, the present invention employs the semi-IPN structure of the polyvinyl alcohol and polyurethane in which the polyvinyl alcohol and polyurethane are physically mixed and then crosslinked to form a network therebetween, as a binder. As a result, by combining the performance of the polyvinyl alcohol capable of maintaining superior binding force between the electrode active materials and between the electrode active material and the current collector with the performance of polyurethane suppressing, due to a superior elongation percentage, stress accumulation resulting from volumetric changes during charge/discharge cycles, and having excellent electrolyte resistance due to a low degree of swelling which is caused by electrolyte absorption in the crosslinked form, it is possible to increase a design capacity of the battery and prevent cracking of electrodes during charge/discharge cycles, and effectively dissipate stress occurring upon charging/discharging to thereby achieve increased lifespan and improved cycle characteristics of the battery.

The polyvinyl alcohol exhibits superior adhesive strength between electrode active materials as well as between the electrode active material and the current collector such as metal foil, via the action of hydroxyl (OH) groups which are repetitively present in the main chain of the polymer. Consequently, it is possible to achieve sufficient adhesion of the electrode active material with the current collector surface even by addition of a relatively tiny amount of the polyvinyl alcohol, and it is also possible to provide a relatively high battery capacity and superior cycle characteristics by preventing the separation of the electrode active material from the current collector surface, resulting from the repeated charge/discharge cycles of the battery. Further, due to higher electrical conductivity than any other polymers, the polyvinyl alcohol at the same content has a significantly low electrical resistance in the electrode and therefore exhibits superior high-rate charge/discharge characteristics.

Therefore, preferred is the polyvinyl alcohol having a high degree of polymerization (DP) and a high degree of saponification (DS). However, an excessively high degree of polymerization may undesirably result in decreased elasticity and poor handleability associated with poor dissolution in the solvent during a manufacturing process of the electrode mix, whereas an excessively low degree of polymerization may result in deterioration of mechanical strength, adhesive strength and solvent resistance. On the other hand, the polyvinyl alcohol having a high degree of saponification leads to improved adhesion between the active material and the current collector such as metal foil, by the action of hydroxyl (OH) functional groups. Hence, more preferred is the polyvinyl alcohol having a higher degree of saponification, if it exhibits good handleability in the solvent.

Taken altogether, the polyvinyl alcohol utilized in the present invention more preferably has a degree of polymerization of more than 2000 and a degree of saponification of more than 80%, more preferably a degree of polymerization of more than 2500 and a degree of saponification of more than 90%.

However, even though many efforts have been made on the use of the polyvinyl alcohol (PVA) binder through combined use of the polyvinyl alcohol with other polymers, copolymerization of the polyvinyl alcohol with other monomers, modification of terminal groups of the polyvinyl alcohol or the like, attempts or suggestions on the single use of polyvinyl alcohol as the binder have suffered from many limitations. One of the causes of such limitations may be the reason that it is not easy to prepare a polyvinyl alcohol having a degree of polymerization falling within the above-specified range.

The process for preparing PVAs having a high degree of polymerization and a high degree of saponification is disclosed in Korean Patent Application No. 2005-0136273, assigned to the present applicant, the disclosures of which are incorporated by reference herein in their entirety. The preparation of PVA having a high degree of polymerization and saponification will be briefly described hereinafter.

Distilled water and a given amount of a PVA suspension (degree of saponification: 80%) are introduced and stirred in a reaction vessel which is then purged with nitrogen freed of oxygen and moisture. A radical initiator such as azobisisobutyronitrile or azobisdimethylvaleronitrile and a vinyl acetate monomer are dissolved and introduced into the contents of the reaction vessel which are then elevated to a given temperature to proceed with polymerization, thereby preparing polyvinyl acetate having a high degree of polymerization. The thus-prepared polyvinyl acetate is filtered, washed and dried, and the dried product is dissolved in methanol. The resulting solution is allowed to proceed with the saponification reaction by adding a strong base, sodium hydroxide twice, thereby obtaining PVA. The polymerization degree of PVA thus prepared may be adjusted to a desired level within the above-specified range, depending upon an amount of an initiator and a reaction temperature. Therefore, it is possible to obtain PVA having a saponification degree of 99% or higher.

Generally, polyurethane has a high elongation percentage to thereby prevent accumulation of stress that may occur during charge/discharge cycles, thus particularly improving cycle characteristics. However, polyurethane exhibits a high degree of electrolyte imbibition during charge/discharge cycles of the battery due to poor electrolyte resistance and also undergoes partial dissolution, thereby decreasing the adhesive strength between the active materials or between the active material and the current collector, which limits the applicability of polyurethane as a battery binder.

Meanwhile, according to the present invention, the polyurethane increases the electrolyte resistance and elongation percentage of the binder via the formation of a semi-IPN with the polyvinyl alcohol and therefore serves to exert buffering action against volumetric changes which may take place during charge/discharge cycles. The polyurethane that can be used in the present invention may be one prepared using various kinds of monomers and methods.

For example, polyurethane may be prepared by bulk or suspension polymerization of polyol and isocyanate. In the molecular structure of polyurethane, the polyol constituting the soft segment of polyurethane and determining the elasticity and softness thereof may be polyethylene glycol (PEG), polypropylene glycol (PPG), polyisobutylene, polytetramethylene glycol (PTMG), polycaprolactone, polyethylene adipate or glycerine. Whereas, as the isocyanate which is the hard segment of polyurethane, there may be used, for example, 4,4-diphenylmethane diisocyanate (MDI), 2,4-, 2,6-toluene diisocyanate (TDI), 4,4-dicyclohexylmethane diisocyanate ($H_{12}$MDI), trans-1,4-cyclohexane diisocyanate (CHDI), isophorone diisocyanate (IPDI), tetramethyl-1,3-xylene diisocyanate (TMXDI), dimeryl diisocyanate (DDI) and hexamethylene diisocyanate (HMDI). Besides them, in order to adjust the structure and physical properties of polyurethane, catalysts such as 1,4-diazabicyclo octane and dibutyltin dilaurate, and a chain extender such as 1,4-butanediol may be additionally employed.

Even though there is no particular limit to the molecular weight of polyurethane, an excessively low molecular weight of polyurethane results in a difficulty to exert the superior elongation percentage of polyurethane in the binder, whereas an excessively high molecular weight of polyurethane leads to a poor crosslinking reaction, which results in decreased adhesion to the electrodes and decreased electrolyte resistance. Therefore, the molecular weight of polyurethane is preferably in the range of 1000 to 50,000.

Further, polyurethane is contained in an amount of preferably 0.1 to 100 parts by weight, more preferably 1 to 50 parts by weight, based on 100 parts by weight of the polyvinyl alcohol. If the content of polyurethane is excessively low, the elongation percentage of the binder is insufficient, which may result in decreased design capacity and deterioration of charge/discharge efficiency. On the other hand, if the content of polyurethane is excessively high, a high affinity of polyurethane for the electrolyte results in absorption of excessive amounts of the electrolyte and swelling of polyurethane, which may, in turn, undesirably cause separation of the electrode from the current collector.

In order to form the semi-IPN following mixing of polyvinyl alcohol and polyurethane, polyvinyl alcohol and polyurethane should be crosslinked therebetween after physical mixing thereof.

In one preferred embodiment of the present invention, the polyurethane before crosslinking contains a terminal group (hereinafter, referred to as "crosslinkable terminal group") that does not react with a hydroxyl group of the polyvinyl alcohol, but has a crosslinkability. After mixing of the polyurethane with the polyvinyl alcohol, the crosslinkable terminal group may undergo the crosslinking reaction.

That is, the crosslinkable terminal group of polyurethane during the mixing or drying process of the electrode mix does not react with the hydroxyl group of the polyvinyl alcohol and therefore does not form a crosslinking bond with the polyvinyl alcohol, but it is possible to form the semi-IPN structure by inducing crosslinking of polyurethane via the reaction of the polyvinyl alcohol and polyurethane in a subsequent step.

Polyurethane bearing the crosslinkable terminal groups may be prepared, for example, by preparing polyurethane having isocyanate groups at both termini and substituting the isocyanate groups of both termini with the crosslinkable terminal groups via the reaction with other materials. Alternatively, the crosslinkable terminal group-containing polyurethane may be prepared by mixing and polymerizing a urethane polymer with a compound simultaneously containing the reactive terminal group and crosslinkable terminal group, upon preparation of the polyurethane.

In one preferred embodiment of the present invention, the polyurethane may be prepared by reacting the urethane polymer containing isocyanate group(s) at either or both of two termini with a material (crosslinkable material) simultaneously containing a hydroxyl group and the crosslinkable terminal group. Therefore, the crosslinkable terminal group-containing polyurethane may be prepared via the reaction of the isocyanate group of the urethane polymer with the hydroxyl group of the crosslinkable material.

The crosslinkable terminal group is a functional group that does not react with the hydroxyl group of the polyvinyl alcohol. Preferably, the crosslinkable terminal group may be a (meth)acrylate group which is thermopolymerizable, such that the crosslinking reaction does not take place in the slurry state at room temperature and can take place without an additional additive during the electrode plate drying process.

There is no particular limit to the crosslinkable material, so long as it contains the hydroxyl group and the crosslinkable terminal group at the same time. Specifically, examples of the crosslinkable material that can be used in the present invention may include, but are not limited to, hydroxyethyl (meth)acrylate, hydroxypropyl (meth)acrylate, 3-acryloyloxy-2-hydroxy propyl methacrylate, 3-chloro-2-hydroxypropyl methacrylate, ethylene glycol acrylate, polyethylene glycol acrylate, propylene glycol acrylate, and polypropylene glycol acrylate.

Particularly preferably, the crosslinkable material may be polyethylene glycol acrylate. The polyethylene glycol acrylate has excellent electrical conductivity and a molecular weight thereof may be appropriately adjusted by controlling the content of glycol. Therefore, use of the polyethylene glycol acrylate provides easy control of the crosslinking reaction.

Where the molecular weight of the crosslinkable material is excessively high, this may lead to lowering of the reactivity with polyurethane and a difficulty to control the reaction. Therefore, the molecular weight of the crosslinkable material is in a range of preferably less than 1000, more preferably 500.

In accordance with another aspect of the present invention, there is provided an electrode mix comprising an electrode active material and the aforesaid binder.

Examples of the cathode active material among the electrode active materials may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$; $LiFe_3O_4$, etc.

As examples of the anode active material that can be used in the present invention, mention may be made of carbon and graphite materials such as natural graphite, artificial graphite, expanded graphite, carbon fibers, non-graphitizing carbon, carbon black, carbon nanotubes, fullerenes and activated carbon; metals such as Al, Si, Sn, Ag, Bi, Mg, Zn, In, Ge, Pb, Pd, Pt and Ti, which are alloyable with a lithium metal, and compounds containing such elements; a composite material of a metal or metal compound and a carbon or graphite material; and a lithium-containing nitride. Among them, more preferred are the carbon-, silicon-, tin-, and silicon/carbon-based active materials, which may be used alone or in any combination thereof.

The electrode active material incorporated in the electrode mix in accordance with the present invention may be an active material for both the anode active material and cathode active material. More preferred is the anode active material undergoing large volumetric changes during charge/discharge cycles.

In particular, the binder of the present invention can be more preferably used when it is desired to use, as an anode active material, the silicon-, tin-or silicon/carbon-based active material, which has a high theoretical capacity but undergoes significant volumetric changes during repeated charge/discharge cycles, thereby suffering limitations in the practical use thereof as the active material.

The silicon-or tin-based anode active material is intended to encompass silicon (Si) particles, tin (Sn) particles, silicon-tin alloy particles, silicon alloy particles, tin alloy particles, composites thereof and the like. Representative examples of the above-mentioned alloys include, but are not limited to, solid solutions, intermetallic compounds and eutectic alloys of Al—Si, Mn—Si, Fe—Si and Ti—Si. As one preferred example of the composite, a silicon/graphite composite may be used and is found in International Publication No. WO 2005/011030, assigned to the present applicant, the disclosures of which are incorporated by reference herein in their entirety. The graphite may be natural or artificial graphite. In addition, the form of graphite is not particularly limited and may be amorphous, plate-like, flaky or grain-like.

The content of the binder is in a range of preferably about 1 to 30% by weight, more preferably 2 to 20% by weight based on the total weight of the electrode mix. In particular, when it is desired to use, as the anode active material, the silicon-, tin-or silicon/carbon-based active material which undergoes significant volumetric changes during repeated charge/discharge cycles, the binder is preferably contained in an amount of more than 10% by weight, based on the total weight of the electrode mix. If the content of the binder is too low, it may be difficult to withstand volumetric changes occurring upon charge/discharge cycling. On the other hand, if the content of the binder is too high, this undesirably leads to a decreased capacity and an increased resistance of the electrodes.

In addition to the electrode active materials and the aforesaid mixed binder, the electrode mix in accordance with the present invention may further include other optional components such as a viscosity adjuster, a conductive material, a filler, a coupling agent and an adhesive accelerator, which are used alone or in any combination thereof.

The viscosity adjuster is a component used to adjust the viscosity of the electrode mix, such that a mixing process of the electrode mix and an application process of the electrode mix to the current collector can be facilitated. The viscosity adjuster may be added in an amount of up to 30% by weight, based on the total weight of the electrode mix. Examples of the viscosity adjuster may include, but are not limited to, carboxymethyl cellulose and polyvinylidene fluoride. Where appropriate, the above-mentioned solvent may also serve as the viscosity adjuster.

The conductive material is a component used to further improve the conductivity of the electrode active material and may be added in an amount of 1 to 20% by weight, based on the total weight of the electrode mix. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an auxiliary component used to inhibit electrode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fibers and carbon fibers.

The coupling agent is an auxiliary component used to increase adhesive strength between the electrode active material and binder, and is characterized by having two or more functional groups. The coupling agent may be added in an amount of up to 30% by weight, based on the weight of the binder. The coupling agent may be a material in which one functional group forms a chemical bond via reaction with a hydroxyl or carboxyl group present on the surface of the silicon-, tin-or graphite-based active material, and the other functional group forms a chemical bond via the reaction with the polymer binder. Specific examples of the coupling agent that can be used in the present invention may include, but are not limited to, silane-based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane and cyanatopropyl triethoxysilane.

The adhesive accelerator is an auxiliary component used to improve adhesive strength of the active material to the current collector, and may be added in an amount of less than 10% by weight, based on the weight of the binder. Examples of the adhesive accelerator that can be used in the present invention may include oxalic acid, adipic acid, formic acid, acrylic acid derivatives, itaconic acid derivatives and the like.

In accordance with a further aspect of the present invention, there is provided an electrode for a secondary battery comprising the aforementioned binder-containing electrode mix applied to a current collector.

In the electrode according to the present invention, the current collector is the site where migration of electrons takes place in the electrochemical reaction of the electrode active material, and is divided into an anode current collector and a cathode current collector, depending upon kinds of electrodes.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver.

These current collectors may also be processed to form fine irregularities on the surfaces thereof so as to enhance adhesive strength to the electrode active materials. In addition, the current collectors may be used in various forms including films, sheets, foils, nets, porous structures, foams and non-woven fabrics.

The secondary battery electrode is fabricated by coating a current collector with an electrode mix containing an electrode active material, a binder, and optionally a conductive material and/or a filler. Specifically, the electrode may be fabricated by dissolving, as a binder, 1 to 10% by weight of a physical mixture of polyvinyl alcohol and polyurethane with acrylate groups terminally introduced therein in a solvent, adding the electrode active material, optionally the conductive material and the filler to the resulting mixture to thereby prepare a slurry, and applying the resulting slurry to the current collector such as metal foil, followed by drying and pressing.

Preferred examples of the solvent used in preparation of the electrode slurry may include, but are not limited to, organic solvents such as dimethyl sulfoxide (DMSO) and N-methyl pyrrolidone (NMP), distilled water, and the like.

Drying of the electrode slurry following application thereof to the current collector may be carried out at a temperature of less than 200° C., preferably less than 150° C. A higher temperature of more than 200° C. may result in decomposition of polyvinyl alcohol and polyurethane and therefore it is impossible to achieve desired effects of the polyvinyl alcohol and polyurethane as the binder.

In accordance with yet another aspect of the present invention, there is provided a lithium secondary battery comprising the above-mentioned electrode. The lithium secondary battery is made of a structure in which an electrode assembly, composed of a cathode, an anode and a separator interposed therebetween, is impregnated within a lithium salt-containing non-aqueous electrolyte.

When the binder of the present invention is used only in either one of the anode and cathode, the other electrode may employ a conventional binder known in the art. As examples of the conventional binder, mention may be made of polyvinylidene fluoride, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, various copolymers, and etc.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt. As the non-aqueous electrolyte, a non-aqueous organic solvent, an organic solid electrolyte or an inorganic solid electrolyte may be utilized.

As the non-aqueous organic solvent that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Example 1

5% by weight of a polyvinyl alcohol having a degree of polymerization (DP) of 4000 was dissolved in dimethyl sulfoxide. To the resulting solution was added polyurethane with terminally introduced acrylate groups, obtained by the polymerization of polypropylene glycol (MW: 450) and hexamethylene diisocyanate and the reaction of the polymerization product with polyethylene glycol acrylate (MW: 375), in an amount of 20% by weight of the polyvinyl alcohol. A small amount of benzoyl peroxide (BPO) as a thermal initiator was added to the solution, followed by physical mixing for more than one hour. The resulting solution was coated to a thickness of 500 μm on copper foil using a doctor blade, and was dried at 130° C. for 2 hours. Thereafter, the copper foil was removed to fabricate a polymer film.

Example 2

A polymer film was fabricated in the same manner as in Example 1, except that polyurethane with terminally introduced acrylate groups was added in an amount of 40% by weight of the polyvinyl alcohol.

Comparative Example 1

5% by weight of a polyvinyl alcohol having a degree of polymerization (DP) of 4000 was dissolved in dimethyl sulfoxide. The resulting solution was coated to a thickness of 500 μm on copper foil using a doctor blade, and was dried at 130° C. for 2 hours. Thereafter, the copper foil was removed to fabricate a polymer film.

Comparative Example 2

5% by weight of a polyvinyl alcohol having a degree of polymerization (DP) of 4000 was dissolved in dimethyl sulfoxide. To the resulting solution was added polyurethane, obtained by the polymerization of polypropylene glycol (MW: 450) and hexamethylene diisocyanate, followed by water precipitation and drying thereof, in an amount of 20% by weight of the polyvinyl alcohol. The resulting solution was coated to a thickness of 500 μm on copper foil using a doctor blade, and was dried at 130° C. for 2 hours. Thereafter, the copper foil was removed to fabricate a polymer film.

Comparative Example 3

5% by weight of a polyvinyl alcohol having a degree of polymerization (DP) of 4000 was dissolved in dimethyl sulfoxide. To the resulting solution was added polyurethane, obtained by the polymerization of polypropylene glycol (MW: 450) and hexamethylene diisocyanate, followed by water precipitation and drying thereof, in an amount of 40% by weight of the polyvinyl alcohol. The resulting solution was coated to a thickness of 500 μm on copper foil using a doctor blade, and was dried at 130° C. for 2 hours. Thereafter, the copper foil was removed to fabricate a polymer film.

Comparative Example 4

A polymer film was fabricated in the same manner as in Comparative Example 1, except that 11% by weight of polyvinylidene fluoride, which has been used as a binder of a conventional lithium secondary battery, was dissolved in N-methyl-2-pyrrolidone (NMP) as a dispersion medium.

Comparative Example 5

A polymer film was fabricated in the same manner as in Comparative Example 1, except that 10 g of a urethane acrylate oligomer, known to have superior elasticity, and 0.3 g of benzoyl peroxide (BPO) as a thermal initiator were mixed in 100 g of NMP as a dispersion medium, thereby preparing a solution.

Example 3

88 g of a silicon-graphite composite active material, 10 g of a polyvinyl alcohol having a degree of polymerization (DP) of 4000, 2 g of polyurethane with terminally introduced acrylate groups, obtained by the polymerization of polypropylene glycol (MW: 450) and hexamethylene diisocyanate and the reaction of the polymerization product with polyethylene glycol acrylate (MW: 375), as set forth in Example 1, a small amount of benzoyl peroxide (BPO) as a thermal initiator, and 2 g of carbon black as a conductive material were mixed in dimethyl sulfoxide (DMSO) as a solvent, and the total content of solids was adjusted to 30% by weight, thereby preparing a slurry. The resulting slurry was coated to a thickness of 100 μm on copper foil using a doctor blade, and was dried in a drying oven at 130° C. for 20 min, followed by rolling it to an appropriate thickness to thereby fabricate an anode.

Example 4

An anode was fabricated in the same manner as in Example 3, except that 4 g of polyurethane with terminally introduced acrylate groups was added.

Comparative Example 6

88 g of a silicon-graphite composite active material, 10 g of a polyvinyl alcohol having a degree of polymerization (DP) of 4000 as a binder, and 2 g of carbon black as a conductive material were mixed in dimethyl sulfoxide (DMSO) as a solvent, and the total content of solids was adjusted to 30% by weight, thereby preparing a slurry. The resulting slurry was coated to a thickness of 100 μm on copper foil using a doctor blade, and was dried in a drying oven at 130° C. for 30 min, followed by rolling it to an appropriate thickness to thereby fabricate an anode.

Comparative Example 7

An anode was fabricated in the same manner as in Comparative Example 6, except that 2 g of polyurethane, obtained by the polymerization of polypropylene glycol (MW: 450) and hexamethylene diisocyanate followed by water precipitation and drying thereof, was added to a binder.

Comparative Example 8

An anode was fabricated in the same manner as in Comparative Example 6, except that 4 g of polyurethane, obtained by the polymerization of polypropylene glycol (MW: 450) and hexamethylene diisocyanate followed by water precipitation and drying thereof, was added to a binder.

Comparative Example 9

An anode was fabricated in the same manner as in Comparative Example 6, except that polyvinylidene fluoride was used instead of a polyvinyl alcohol.

Comparative Example 10

An anode was fabricated in the same manner as in Comparative Example 6, except that 10 g of urethane acrylate and 0.3 g of benzoyl peroxide (BPO) as an initiator were used instead of a polyvinyl alcohol.

Example 5

Anode plate fabricated in Examples 3 was pressed and punched into a round sample having a surface area of 1.49 cm$^2$ which was then used as a working electrode (anode), and a round punched lithium metal foil was used as a counter electrode (cathode), thereby fabricating a coin-type half cell. A separator formed of a porous polypropylene film was interposed between the working electrode and counter electrode, and an electrolyte of 1M LiPF$_6$ in a mixed solvent of ethylene carbonate (EC)/diethyl carbonate (DEC)/ethyl methyl carbonate (EMC) (volume ratio of 4:3:3) was injected into the resulting electrode assembly to thereby fabricate a lithium secondary battery.

Example 6

A lithium secondary battery was fabricated in the same manner as in Example 5, except that the anode fabricated in Example 4 was used.

Comparative Example 11

A lithium secondary battery was fabricated in the same manner as in Example 5, except that the anode fabricated in Comparative Example 6 was used.

Comparative Example 12

A lithium secondary battery was fabricated in the same manner as in Example 5, except that the anode fabricated in Comparative Example 7 was used.

Comparative Example 13

A lithium secondary battery was fabricated in the same manner as in Example 5, except that the anode fabricated in Comparative Example 8 was used.

Comparative Example 14

A lithium secondary battery was fabricated in the same manner as in Example 5, except that the anode fabricated in Comparative Example 9 was used.

Comparative Example 15

A lithium secondary battery was fabricated in the same manner as in Example 5, except that the anode fabricated in Comparative Example 10 was used.

EXPERIMENTAL EXAMPLES

The following experiments were carried out to analyze characteristics of polymer films and electrodes fabricated according to the present invention.

Experimental Example 1

In order to measure elasticity of the individual polymer films fabricated in Examples 1 and 2 of the present invention and Comparative Examples 1 to 5, experiments were carried out according to ASTM D638 standard test method. For evaluation, elasticity was measured for more than 5 samples and the average value was calculated. The experimental results thus obtained are given in Table 1 below.

Experimental Example 2

In order to measure the swelling degree of the polymer films in a lithium salt-free electrolyte, EC (ethyl carbonate), DEC (diethyl carbonate) and EMC (ethyl-methyl carbonate) were mixed in a ratio of 4:3:3 (v/v). The polymer films fabricated in Examples 1 and 2 and Comparative Examples 1 to 5 were cut into round samples having a diameter of 1 cm, and soaked in 10 mL of the resulting mixed solution which was then sealed and stored in an incubator at 25° C. 120 hours later, the films were taken from the electrolyte and the remaining electrolyte on the film surface was wiped with a dry paper, followed by measuring changes in the weight of films relative to the initial weight. The swelling degree of the polymer films in the electrolyte was calculated according to the following equation. For evaluation, the swelling (%) was measured for more than 5 samples and the average value was calculated. The experimental results thus obtained are given in Table 1 below.

Swelling (%)=(weight after soaking in electrolyte−weight before soaking in electrolyte)/(weight before soaking in electrolyte)×100

Experimental Example 3

An experiment was carried out in the same manner as in Experimental Example 1, except that a mixed solution of EC (ethyl carbonate):DEC (diethyl carbonate):EMC (ethyl-methyl carbonate) (4:3:3, v/v) containing 1M LiPF$_6$ was used to measure the swelling degree of the polymer films in a lithium salt-containing electrolyte. The experimental results thus obtained are given in Table 1 below.

TABLE 1

|  | Elasticity (%) | Swelling in lithium salt-free electrolyte (%) | Swelling in lithium salt-containing electrolyte (%) |
|---|---|---|---|
| Ex. 1 | 41.45 | 4.21 | 5.34 |
| Ex. 2 | 63.46 | 6.46 | 7.45 |
| Comp. Ex. 1 | <10 | 1.59 | 2.21 |
| Comp. Ex. 2 | 52.12 | 11.35 | 14.23 |
| Comp. Ex. 3 | 130.24 | 36.23 | 38.94 |
| Comp. Ex. 4 | <10 | 7.28 | 9.54 |
| Comp. Ex. 5 | 140.26 | 44.4 | 52.77 |

As can be seen from the experimental results of Table 1, the polymer films with addition of polyurethane (Examples 1 and 2 and Comparative Examples 2 and 3) exhibited a significant increase in elasticity, as compared to the polymer film using the polyvinyl alcohol (Comparative Example 1). On the other hand, it can be seen that the polymer films with addition of a simple physical mixture of polyurethane with the polyvinyl alcohol (Comparative Examples 2 and 3) exhibit an increase in elasticity as the content of added polyurethane increases, but show a significant decrease in the electrolyte resistance due to an increased degree of swelling in the electrolyte.

However, the polymer films with addition of semi-IPN-formed polyurethane (Examples 1 and 2), as polyurethane is present in the crosslinked state, did not exhibit a significant increase in the degree of swelling in the electrolyte even with increasing contents of added polyurethane, and showed an increase in elasticity.

Further, it can be seen that the polymer films of Examples 1 and 2 exhibit a significantly lower degree of swelling in the electrolyte, as compared to that of Comparative Example 5 with addition of urethane acrylate, generally known to have a high elasticity, a low degree of swelling in the electrolyte and a superior elongation percentage as compared to a conventional PVdF binder.

Experimental Example 4

In order to measure the adhesive strength between an electrode active material and a current collector when the polymer films of the present invention were used as a binder, the surface of the fabricated electrode was cut into a given size and mounted on a slide glass. Then, the current collector was peeled off while 180-degree peel strength was measured. In addition, the electrode was soaked in the above lithium salt-free electrolyte (see Experimental Example 2) for 120 hours, and thereafter the electrolyte was thoroughly dried and the peel strength was measured in the same manner as above. The results thus obtained are given in Table 2 below. For evaluation, the peel strength was measured for more than 5 samples and the average value was calculated.

TABLE 2

| Electrode adhesive strength (g/cm) | EX. 3 | Ex. 4 | Comp. Ex. 6 | Comp. Ex. 7 | Comp. Ex. 8 | Comp. Ex. 9 | Comp. Ex. 10 |
|---|---|---|---|---|---|---|---|
| Fresh electrode | 1215 | 1156 | 1260 | 1184 | 1094 | 21 | 75 |
| Electrolyte-soaked electrode | 1193 | 1084 | 465 | 797 | 465 | <5 | 27 |

As can be seen from Table 2, the polymer films with addition of polyvinyl alcohol as a binder (Examples 3 and 4, and Comparative Examples 6 to 8) exhibit a significantly superior adhesive strength, as compared to the PVdF binder used in conventional carbon-based electrodes and the urethane acrylate binder having superior elasticity. The polymer films with addition of polyurethane, addition of a simple mixture of polyurethane and polyvinyl alcohol, and addition of the semi-IPN-formed polyurethane exhibited a small decrease in adhesive strength, as compared to the film with only use of polyvinyl alcohol, but there was no significant difference therebetween.

Upon reviewing the adhesive strength after contact of the electrodes with the electrolyte, a simple physical mixture of polyurethane with the polyvinyl alcohol exhibited a significant decrease in adhesive strength, whereas the formation of semi-IPN showed no significant decrease in adhesive strength even after contact of the electrodes with the electrolyte. This is because the simple mixture of polyurethane with the polyvinyl alcohol leads to lowering of the adhesive strength between the active materials or between the active material and the current collector, due to a high degree of swelling in the electrolyte, as described hereinbefore, whereas the formation of semi-IPN leads to maintenance of adhesion to the electrode even after contact of the electrode with the electrolyte, due to a low degree of swelling-in-electrolyte which results from crosslinking of polyurethane between polyvinyl alcohol polymer chains. It can be seen that the adhesive strength further increases with increasing amounts of added polyurethane, and incorporation of 40% by weight of polyurethane (Comparative Example 8) exhibits a significant decrease in adhesive strength after contact of the electrode with the electrolyte. Meanwhile, it can be seen that electrode plates using the conventional PVdF or urethane acrylate binder exhibit a significant decrease in adhesive strength after soaking of the plates in the electrolyte.

Experimental Example 5

For performance evaluation, the test cells thus fabricated were subjected to a charge/discharge test. First, the charge/discharge test was conducted twice at a charge/discharge current density of 0.1 C, a charge end voltage of 5 mV (Li/Li$^+$) and a discharge end voltage of 1 V (Li/Li$^+$). Subsequently, the charge/discharge test was conducted 48 times at a charge/discharge current density of 0.5 C, a charge end voltage of 5 mV (Li/Li$^+$) and a discharge end voltage of 1 V (Li/Li$^+$). Charge of the test cells was conducted according to a constant-current/constant-voltage method, and an end current of constant-voltage charge was set to 0.005 C. After the test of a total of 50 cycles was finished, the discharge capacity and charge/discharge efficiency (discharge capacity/charge capacity) of the 1$^{st}$ cycle were calculated. In addition, a capacity ratio (50$^{th}$/1$^{st}$) was calculated by dividing the discharge capacity of the 50$^{th}$ cycle by the discharge capacity of the 1$^{st}$ cycle and was taken as a capacity retention rate. The experimental results thus obtained are given in Table 3 below.

TABLE 3

|  | Initial discharge capacity (mAh/g) | Initial charge/discharge efficiency (%) | 50-cycle efficiency (%) |
|---|---|---|---|
| Ex. 5 | 2067.24 | 85.1 | 91.67 |
| Ex. 6 | 2078.13 | 85.4 | 91.34 |
| Comp. Ex. 11 | 1930.23 | 85.1 | 84.12 |
| Comp. Ex. 12 | 2012.23 | 85.2 | 80.65 |
| Comp. Ex. 13 | 2034.24 | 85.1 | 54.38 |

TABLE 3-continued

|  | Initial discharge capacity (mAh/g) | Initial charge/discharge efficiency (%) | 50-cycle efficiency (%) |
|---|---|---|---|
| Comp. Ex. 14 | 1822.54 | 73.5 | 63.2 |
| Comp. Ex. 15 | 2352.76 | 74.3 | <20 |

As can be seen from Table 3, use of polyvinyl alcohol and polyurethane in the form of semi-IPN as the binder (Examples 5 and 6) maintained a significantly higher 50-cycle efficiency, as compared to use of a simple mixture of polyurethane with the polyvinyl alcohol (Comparative Example 12). Use of the simple mixture of polyurethane with the polyvinyl alcohol showed a decrease in the cycle efficiency because of easy separation of the active material from the current collector, due to a high degree of swelling of the binder in the electrolyte as charge/discharge cycles are repeated. Such a phenomenon becomes more serious as the amount of polyurethane to be used increases. As can be seen from Comparative Example 13, the cycle efficiency sharply decreased when polyurethane was added in an amount of 40% by weight of the polyvinyl alcohol.

However, since the binder is present in the form of a network upon formation of semi-IPN, swelling of the binder in the electrolyte is not significant during repeated charge/discharge cycling, and stress due to volume expansion is uniformly dissipated. Therefore, separation of the active material from the current collector does not take place even after repeated charge/discharge cycles and adhesion between the active materials is also maintained, so the cycle efficiency does not significantly decrease. Further, it can be seen that the initial discharge capacity increases more than for only use of the polyvinyl alcohol and the initial efficiency is maintained at the similar level.

Therefore, upon application of polyurethane and polyvinyl alcohol in the form of semi-IPN as the binder, hydroxyl groups of the polyvinyl alcohol combine with the current collector copper, which consequently maintains the adhesion between the active material and the current collector upon charge/discharge cycling, and simultaneously the crosslinked polyurethane having superior elasticity and high electrolyte resistance minimizes the occurrence of electrode cracking due to volume expansion which may take place during repeated charge/discharge cycles, consequently reducing non-reversible portions to thereby maintain the cycle efficiency at the maximum level.

Further, the battery of the present invention exhibited superior initial capacity, initial efficiency and cycle efficiency, as compared to the battery using the conventional PVDF binder (Comparative Example 14). In addition, the battery of the present invention exhibited much better battery efficiency, as compared to the battery using the urethane acrylate binder having superior elasticity and resistance while showing excessive swelling in the electrolyte and thereby low adhesive strength (Comparative Example 15).

INDUSTRIAL APPLICABILITY

As apparent from the above description, the present invention employs a material wherein polyvinyl alcohol and polyurethane form semi-IPN, as a binder for an electrode. As a result, the binder provides excellent adhesion between an electrode mix and a current collector, excellent electrolyte resistance and moderate elongation percentage. Accordingly, it is possible to achieve stable maintenance of adhesion between the active materials and/or adhesion between the active material and the current collector particularly even upon significant volumetric changes of anode active materials during charge/discharge cycles, and minimization of the electrode cracking which may occur due to volume expansion of the active materials. Therefore, the present invention enables commercialization of a high-capacity silicon-or tin-based anode active material, and it is thus possible to manufacture a large-capacity lithium secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode mix comprising an electrode active material and a binder, wherein the binder comprises a semi-interpenetrating polymer network of polyvinyl alcohol and polyurethane, wherein the polyurethane is mixed to crosslink with the polyvinyl alcohol to form the semi-interpenetrating polymer network, wherein the polyvinyl alcohol has hydroxyl groups which are repetitively present in the main chain of the polyvinyl alcohol, and the degree of polymerization of the polyvin alcohol is greater than 2500.

2. The electrode mix according to claim 1, wherein the polyvinyl alcohol has a degree of saponification of more than 90%.

3. The electrode mix according to claim 1, wherein the polyurethane has a molecular weight of 1000 to 50,000.

4. The electrode mix according to claim 1, wherein the polyurethane before crosslinking contains a terminal group that does not react with a hydroxyl group of the polyvinyl alcohol, but has a crosslinkability, and the crosslinkable terminal group undergoes the crosslinking reaction, after mixing of the polyurethane with the polyvinyl alcohol.

5. The electrode mix according to claim 4, wherein the polyurethane is prepared by reacting a urethane polymer containing isocyanate group(s) at either or both of two termini with a material (crosslinkable material) containing both of the hydroxyl group and the crosslinkable terminal group.

6. The electrode mix according to claim 5, wherein the crosslinkable terminal group is a (meth)acrylate group.

7. The electrode mix according to claim 5, wherein the crosslinkable material is polyethylene glycol acrylate.

8. The electrode mix according to claim 1, wherein the content of the polyurethane is in the range of 1 to 100 parts by weight, based on 100 parts by weight of the polyvinyl alcohol.

9. The electrode mix according to claim 1, wherein the content of the binder is in the range of 1% to 30% by weight, based on the total weight of the electrode mix.

10. The electrode mix according to claim 1, wherein the electrode active material is an anode active material.

11. The electrode mix according to claim 10, wherein the anode active material includes at least one material selected from the group consisting of a carbon-based active material, a silicon-based active material, a tin-based active material, a silicon/carbon-based active material and any combination thereof.

12. The electrode mix according to claim 10, wherein the content of the binder is in the range of more than 10% by weight, based on the total weight of the electrode mix, when the electrode active material includes, as the anode active material, the silicon-based active material, the tin-based active material or the silicon/carbon-based active material which undergoes significant volumetric changes during charge/discharge cycles.

13. An electrode for a secondary battery comprising the electrode mix of claim 1 applied to a current collector.

14. A lithium secondary battery comprising the electrode of claim 13.

* * * * *